United States Patent [19]

Coldrick et al.

[11] Patent Number: 5,342,732
[45] Date of Patent: Aug. 30, 1994

[54] PHOTOGRAPHIC HIGH CONTRAST SILVER HALIDE MATERIALS

[75] Inventors: Philip J. Coldrick, Hayes; Julia Pich, Richmansworth, both of United Kingdom

[73] Assignee: Eastman Kodak Company, Rochester, N.Y.

[21] Appl. No.: 941,083

[22] PCT Filed: Feb. 18, 1992

[86] PCT No.: PCT/EP92/00335
§ 371 Date: Oct. 13, 1992
§ 102(e) Date: Oct. 13, 1992

[87] PCT Pub. No.: WO92/15042
PCT Pub. Date: Sep. 3, 1992

[30] Foreign Application Priority Data

Feb. 20, 1991 [GB] United Kingdom ............... 9103560
Mar. 1, 1991 [GB] United Kingdom ............... 9104385

[51] Int. Cl.⁵ ............................................ G03C 1/06
[52] U.S. Cl. .................................. 430/264; 430/592; 430/598
[58] Field of Search .................... 430/264, 592, 598

[56] References Cited

U.S. PATENT DOCUMENTS

| | | | |
|---|---|---|---|
| 3,326,689 | 6/1967 | Fix et al. | 430/346 |
| 3,520,693 | 7/1970 | Gotze et al. | 430/592 |
| 4,857,450 | 8/1989 | Burrows et al. | 430/592 |
| 4,975,354 | 12/1990 | Machonkin et al. | 430/264 |
| 4,988,604 | 1/1991 | Machonkin et al. | 430/254 |

FOREIGN PATENT DOCUMENTS 0244200 11/1987 European Pat. Off.
0364166 4/1990 European Pat. Off.

Primary Examiner—Thomas R. Neville
Attorney, Agent, or Firm—Alfred P. Lorenzo

[57] ABSTRACT

A photosensitive photographic silver halide material comprising a support bearing a layer of a silver halide emulsion comprising at least 50% silver chloride which contains in or adjacent the emulsion layer a hydrazide nucleating agent and an amine booster, the combination of which is capable of providing high contrast images, which emulsion is sensitised with a dye of the general formula:

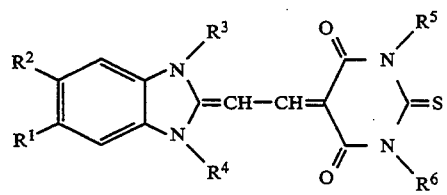

wherein
each of $R^1$ and $R^2$ are individually hydrogen, or halogen atom or an alkyl group of 1-4 carbon atoms, a sulfoalkyl, a trifluoromethyl, or cyano group, $R^3$ is an alkyl or substituted alkyl group, $R^4$ is a sulfoalkyl group, and $R^5$ and $R^6$ are individually an alkyl or substituted alkyl group, and wherein there is the necessary counter-ion.

7 Claims, No Drawings

PHOTOGRAPHIC HIGH CONTRAST SILVER HALIDE MATERIALS

This invention relates to photographic high contrast silver halide materials and to methods of obtaining high contrast images therewith.

For many years the very high contrast photographic images needed in the graphic arts and printing industries were obtained by developing a 'lith' emulsion (usually high in silver chloride content) in a hydroquinone, low sulfite, 'lith' developer by the process known as infectious development. However, such low sulfite developers are inherently unstable and are particularly inappropriate for machine processing.

Recently emulsions containing hydrazide nucleating agents have been used and processed in a developer with conventional amounts of sulfite, hydroquinone and possibly metal or a pyrazolidone. Such developers also essentially contain an amine additive as described in U.S. Pat. No. 4,269,929. Other developers containing amines are described in U.S. Pat. Nos. 4,668,605 and 4,740,452.

Many hydrazides have been proposed for use in such materials, for example in U.S. Pat. Nos. 4,323,643, 4,278,748, 4,031,127, 4,030,925 and 4,323,643 and in European Patent 0,333,435.

More recently it has been proposed to incorporate amine boosters in high contrast materials with the advantage that it is not necessary to have a special developer in order to obtain the very high contrast that is demanded by much graphic arts work. Such amine boosters are described in Japanese Patent Publications 140340/85 and 222241/87 and in U.S. Pat. No. 4975354 (European Patent 0,364,166).

U.S. Pat. No. 4,857,450 describes so-called high contrast negative materials suitable for laser scanning applications wherein certain spectral sensitising dyes are used in order to obtain "good long term stability and unexpectedly good sensitivity". The examples given show materials having contrasts in the range 4.88 to 6.29 and (in Example 5) a contrast in the toe region of 1.17. Such modest contrasts are inadequate for the high quality now demanded in this field.

The present invention provides high contrast film materials suitable for laser scanning which can be developed in a non-specialist developer to obtain very high contrasts in the range 8 to 16 or more with toe contrasts in the range 4 to 10 or more with good photographic speeds. In addition it has been found that the presently used sensitising dyes provide good safelight handling characteristics to the photographic materials and do not cause any reductions in intrinsic speed.

According to the present invention there is provided a photosensitive photographic silver halide material comprising a support bearing a layer of a silver halide emulsion comprising at least 50% silver chloride which contains in or adjacent the emulsion layer a hydrazide nucleating agent and an amine booster, the combination of which is capable of providing high contrast images, which emulsion is sensitised with a dye of the general formula:

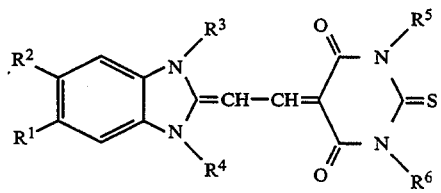

wherein
each of $R^1$ and $R^2$ are individually hydrogen, or halogen atom or an alkyl group of 1–4 carbon atoms, a sulfoalkyl, a trifluoromethyl, or cyano group, $R^3$ is an alkyl or substituted alkyl group, $R^4$ is a sulfoalkyl group, and $R^5$ and $R^6$ are individually an alkyl or substituted alkyl group, and
wherein there is the necessary counter-ion.

Groups which $R^1$ and $R^2$ may represent include methyl, ethyl, propyl, butyl, sulfoethyl and sulfopropyl, Cl, Br, CN and $CF_3$. $R^4$ may be, for example, a sulfoethyl, sulfopropyl or sulfobutyl group and the counterion may be an alkali metal, for example, sodium or potassium. Examples of substituent groups that may be on alkyl groups $R^3$, $R^5$ and $R^6$ are: alkoxy groups, carboxy groups, sulfo groups, sulfonamido groups, and halogen atoms.

The preferred amine boosters to be used in the present invention are those described in the European Patent referred to above wherein they are defined as an amino compound which:

(1) comprises at least one secondary or tertiary amino group, (2) contains within its structure a group comprised of at least three repeating ethyleneoxy units, and (3) has an n-octanol/water partition coefficient (log P) of at least one, preferably at least three, and most preferably at least four, log P being defined by the formula:

$$\log P = \log \frac{[X]_{octanol}}{[X]_{water}}$$

wherein X is the concentration of the amino compound.

Included within the scope of the amino compounds utilized in this invention are monoamines, diamines and polyamines. The amines can be aliphatic amines or they can include aromatic or heterocyclic moieties. Aliphatic, aromatic and heterocyclic groups present in the amines can be substituted or unsubstituted groups. Preferably, the amino compounds employed in this invention as "incorporated boosters" are compounds of at least 20 carbon atoms. It is also preferred that the ethyleneoxy units are directly attached to the nitrogen atom of a tertiary amino group.

Preferably the partition coefficient is at least three, most preferably at least 4.

Preferred amino compounds for the purposes of this invention are bis-tertiary-amines which have a partition coefficient of at least three and a structure represented by the formula:

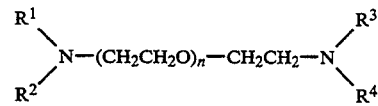

wherein n is an integer with a value of 3 to 50, and more preferably 10 to 50, $R_1$, $R_2$, $R_3$ and $R_4$ are, independently, alkyl groups of 1 to 8 carbon atoms, $R_1$ and $R_2$ taken together represent the atoms necessary to complete a heterocyclic ring, and $R_3$ and $R_4$ taken together represent the atoms necessary to complete a heterocyclic ring.

Another preferred group of amino compounds are bis-secondary amines which have a partition coefficient of at least three and a structure represented by the formula:

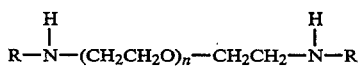

wherein n is an integer with a value of 3 to 50, and more preferably 10 to 50, and each R is, independently, a linear or branched, substituted or unsubstituted, alkyl group of at least 4 carbon atoms.

Particular amine boosters are listed in European Specification 0,364,166.

Any hydrazine compound that functions as a nucleator and is capable of providing Jointly with the amine booster high contrast can be used in the practice of this invention.

The hydrazine compound is incorporated in the photographic element, for example, it can be incorporated in a silver halide emulsion layer. Alternatively, the hydrazine compound can be present in a hydrophilic colloid layer of the photographic element, preferably a hydrophilic colloid layer which is coated to be adjacent to the emulsion layer in which the effects of the hydrazine compound are desired. It can, of course, be present in the photographic element distributed between or among emulsion and hydrophilic colloid layers, such as undercoating layers, interlayers and overcoating layers.

Such hydrazine compounds may have the formula:

wherein $R^9$ is a phenyl nucleus having a Hammett sigma value-derived electron withdrawing characteristic of less than $+0.30$.

In the above formula, $R^9$ can take the form of a phenyl nucleus which is either electron donating (electropositive) or electron withdrawing (electronegative); however, phenyl nuclei which are highly electron withdrawing produce inferior nucleating agents. The electron withdrawing or electron donating characteristic of a specific phenyl nucleus can be assessed by reference to Hammett sigma values.

Preferred phenyl group substituents are those which are not electron withdrawing. For example, the phenyl groups can be substituted with straight or branched chain alkyl groups (e.g., methyl, ethyl, n-propyl, isopropyl, n-butyl, isobutyl, n-hexyl, n-octyl, tert-octyl, n-decyl, n-dodecyl and similar groups). The phenyl groups can be substituted with alkoxy groups wherein the alkyl moieties thereof can be chosen from among the alkyl groups described above.

The phenyl groups can also be substituted with acylamino groups. Illustrative acylamino groups include acetylamino, propanoylamino, butanoylamino, octanoylamino, benzoylamino, and similar groups.

In one particularly preferred form the alkyl, alkoxy and/or acylamino groups are in turn substituted with a conventional photographic ballast, such as the ballasting moieties of incorporated couplers and other immobile photographic emulsion addenda. The ballast groups typically contain at least eight carbon atoms and can be selected from both aliphatic and aromatic relatively unreactive groups, such as alkyl, alkoxy, phenyl, alkylphenyl, phenoxy, alkylphenoxy and similar groups.

The alkyl and alkoxy groups, including hallasting groups, if any, preferably contain from 1 to 20 carbon atoms, and the acylamino groups, including hallasting groups, if any, preferably contain from 2 to 21 carbon atoms. Generally, up to about 30 or more carbon atoms in these groups are contemplated in their ballasted form. Methoxyphenyl, tolyl (e.g., p-tolyl and m-tolyl) and ballasted butyramidophenyl nuclei are specifically preferred.

Examples of the specifically preferred hydrazine compounds are the following:
1-Formyl-2-(4-[2-(2,4-di-tert-pentylphenoxy)-butyramido]phenyl)hydrazine,
1-Formyl-2-phenylhydrazine,
1-Formyl-2-(4-methoxylphenyl)hydrazine,
1-Formyl-2-(4-chlorophenyl)hydrazine,
1-Formyl-2-(4-fluorophenyl)hydrazine,
1-Formyl-2-(2-chlorophenyl)hydrazine, and
1-Formyl-2-(p-tolyl)hydrazine.

The hydrazide may also comprise an adsorption promoting moiety. Hydrazides of this type contain an unsubstituted or mono-substituted divalent hydrazo moiety and an acyl moiety. The adsorption promoting moiety can be chosen from among those known to promote adsorption of photographic addenda to silver halide grain surfaces. Typically, such moieties contain a sulfur or nitrogen atom capable of complexing with silver or otherwise exhibiting an affinity for the silver halide grain surface. Examples of preferred adsorption promoting moieties include thioureas, heterocyclic thioamides and triazoles. Exemplary hydrazides containing an adsorption promoting moiety include:
1-[4-(2-formylhydrazino)phenyl]-3-methyl thiourea,
3-[4-(2-formylhydrazino)phenyl-5-(3-methyl-2-benzoxazolinylidene) rhodanine-6-([4-(2formylhydrazino)-phenyl]ureylene)-2methylbenzothiazole,
N-(benzotriazol-5-yl)-4-(2-formylhydrazino)-phenylacetamide, and
N-(benzotriazol-5-yl)-3-(5-formylhydrazino-2-methoxyphenyl)propionamide and N-2-(5,5-dimethyl-2-thiomidazol-4-yl-idenimino) ethyl-3-[5-(formylhydrazino)-2-methoxyphenyl]propionamide.

An especially preferred class of hydrazine compounds for use in the elements of this invention are sulfonamido-substituted hydrazines having one of the following structural formulae:

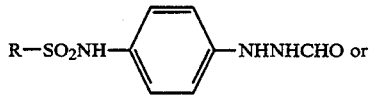

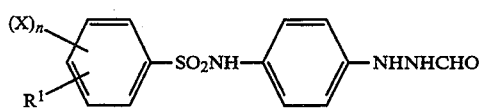

wherein:

R is alkyl having from 6 to 18 carbon atoms or a heterocylic ring having 5 or 6 ring atoms, including ring atoms of sulfur or oxygen;

$R^1$ is alkyl or alkoxy having from 1 to 12 carbon atoms;

X is alkyl, thioalkyl or alkoxy having from 1 to about 5 carbon atoms; halogen; or —NHCOR$^2$, —NHSO$_2$R$^2$, —CONR$^2$R$^3$ or —SO$_2$R$^2$R$^3$ where R$^2$ and R$^3$, which can be the same or different, are hydrogen or alkyl having from 1 to about 4 carbon atoms; and n is 0, 1 or 2.

Alkyl groups represented by R can be straight or branched chain and can be substituted or unsubstituted. Substituents include alkoxy having from 1 to 4 carbon atoms, halogen atoms (e.g. chlorine and fluorine), or —NHCOR$^2$— or —NHSO$_2$R$^2$— where R$^2$ is as defined above. Preferred R alkyl groups contain from 8 to 16 carbon atoms since alkyl groups of this size impart a greater degree of insolubility to the hydrazide nucleating agents and thereby reduce the tendency of these agents to be leached during development from the layers in which they are coated into developer solutions.

Heterocyclic groups represented by R include thienyl and furyl, which groups can be substituted with alkyl having from 1 to 4 carbon atoms or with halogen atoms, such as chlorine.

Alkyl or alkoxy groups represented by $R^1$ can be straight or branched chain and can be substituted or unsubstituted. Substituents on these groups can be alkoxy having from 1 to 4 carbon atoms, halogen atoms (e.g. chlorine or fluorine); or —NHCOR$^2$ or —NHSO$_2$R$^2$ where R$^2$ is as defined above. Preferred alkyl or alkoxy groups contain from 1 to 5 carbon atoms in order to impart sufficient insolubility to the hydrazide nucleating agents to reduce their tendency to being leached out of the layers in which they are coated by developer solution.

Alkyl, thioalkyl and alkoxy groups which are represented by X contain from 1 to 5 carbon atoms and can be straight or branched chain. When X is halogen, it may be chlorine, fluorine, bromine or iodine. Where more than one X is present, such substituents can be the same or different.

Particularly preferred nucleators have the following formulae:

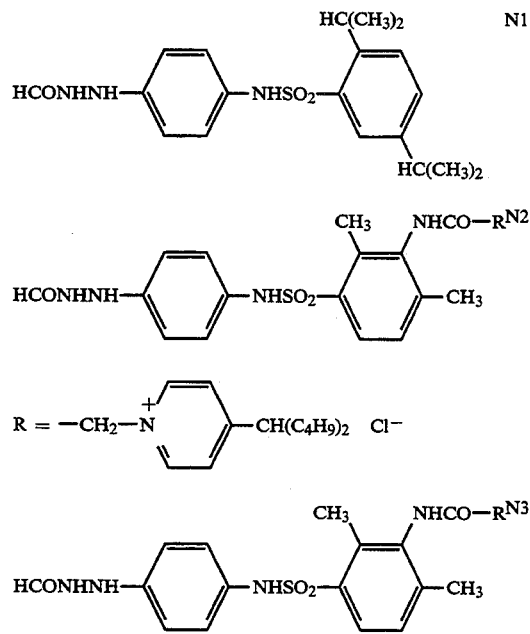

-continued
$R = -CH_2S-(CH_2CH_2O)_4-C_8H_{17}$

The photosensitive silver halide emulsions employed in the present materials may contain both silver bromide and silver iodide in addition to the silver chloride. Preferably the iodide content is less than 10 mole percent. Substantially pure silver chloride emulsions may be used although the preferred emulsions comprise 70 mole % chloride and 30 mole % bromide. As is known in the graphic arts field the grains may be doped with Rhodium, Ruthenium, Iridium or other Group VIII metals. The emulsions may be negative or direct positive emulsions, mono- or polydisperse.

Preferably the silver halide grains are doped with Group VIII metal at levels in the range $10^{-9}$ to $10^{-3}$, preferably $10^{-6}$ to $10^{-3}$, mole metal per mole of silver. The preferred Group VIII metal is Rhodium.

The emulsions employed and the addenda added thereto, the binders, supports, etc may be as described in Research Disclosure Item 308119, December, 1989 published by Kenneth Mason Publications, Emsworth, Hants, United Kingdom.

The light-sensitive silver halide contained in the photographic elements can be processed following exposure to form a visible image by associating the silver halide with an aqueous alkaline medium in the presence of a developing agent contained in the medium or the element. It is a distinct advantage of the present invention that the described photographic elements can be processed in conventional developers as opposed to specialized developers conventionally employed in conjunction with lithographic photographic elements to obtain very high contrast images. When the photographic elements contain incorporated developing agents, the elements can be processed in the presence of an activator, which can be identical to the developer in composition, but otherwise lacking a developing agent.

Very high contrast images can be obtained at pH values in the range of from 11 to 12.3, but preferably lower pH values, for example below 11 and most preferably in the range of 10.3 to 10.5 are preferably employed for processing the photographic recording materials as described herein.

The developers are typically aqueous solutions, although organic solvents, such as diethylene glycol, can also be included to facilitate the solvency of organic components. The developers contain one or a combination of conventional developing agents, such as a polyhydroxybenzene, aminophenol, paraphenylenediamine, ascorbic acid, pyrazolidone, pyrazolone, pyrimidine, dithionite, hydroxylamine or other conventional developing agents.

It is preferred to employ hydroquinone and 3-pyrazolidone developing agents in combination. The pH of the developers can be adjusted with alkali metal hydroxides and carbonates, borax and other basic salts. To reduce gelatin swelling during development, compounds such as sodium sulfate can be incorporated into the developer. Also, compounds such as sodium thiocyanate can be present to reduce granularity. Chelating and sequestering agents, such as ethylenediaminetetraacetic acid or its sodium salt, can be present. Generally, any conventional developer composition can be employed in the practice of this invention. Specific illustrative photographic developers are disclosed in the Handbook of Chemistry and Physics, 36th Edition, under the title "Photographic Formulae" at page 3001 et seq. and in Processing Chemicals and Formulas, 6th Edition, published by Eastman Kodak Company (1963). The photographic elements can, of course, be processed with conventional developers for lithographic photographic elements, as illustrated by U.S. Pat. No. 3,573,914 and UK Patent No. 376,600.

The following Examples are included for a better understanding of the invention.

EXAMPLE 1

A layer of the emulsion described below was coated on a polyethyleneterephthalate film base having a blue/green absorbing layer on the back.

The emulsion layer consists of a 70:30 rhodium doped chlorobromide cubic monodispersed emulsion (0.22 μm edge length) and coated at 3.4 g Ag/sq.m. in a gel vehicle of 2.5 g/sq.m. The emulsion is chemically sensitized with sulfur and gold. Other addenda included in the layer are sensitizing dye A, 2-methylmercapto-5-carboxy-6-methyl tetraazindene at 243 mg/Ag mole, latex copolymer of methyl acrylate, 2-acrylamido-2-methylpropanesulphonic acid and the sodium salt of 2-acetoxyethyl methacrylate (88:5:7 by weight) at 22 g/Ag mole, sequestering agent (EDTA di-Na salt) at 1.8 g/Ag mole, nucleating agent e.g. N1 and incorporated booster (Booster B1) at 1.5 g/Ag mole.

The supercoat consists of gel at 0.5 g/sq.m. with surfactant to aid coating and matting beads to aid film handling. The layers are hardened with BVSM at 3% of the total gel.

For photographic evaluation the coating was exposed through a 0.1 increment step tablet by a short duration flash exposure with a P11 filter to give a broad band 470–490 nm exposure. The material was then processed in KODAK RA2000 developer diluted 1+4 with water. A processing temperature of 35° C. and development time of 30 s was used.

Examples of the sensitizing dyes, nucleators and booster are shown in the tables below together with the sensitometric performance.

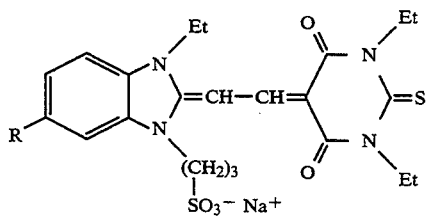

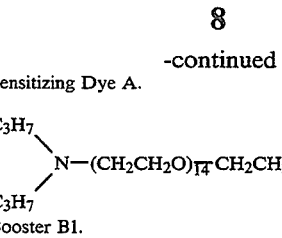

Sensitizing Dye A.

Booster B1.

EXPLANATION OF SENSITOMETRIC PARAMETERS

SPD = Rel logE to give a density 0.6 above Dmin

PDP = Practical density point measured as density achieved by an exposure 0.41 ogE units higher than SPD TOE = Gradient of line between densities of 0.1 and 0.6 above Dmin Dmin = Minimum density point

TABLE 1

Thiobarbituric acid dimethine merocyanine dyes

| Sens dye A mM/Agmole | Nucleator mg/AgM | Booster g/Agm | SPD | PDP | TOE | Dmin | Intrinsic SPD |
|---|---|---|---|---|---|---|---|
| R = H* 0.3 mM | N1 190 mg | B1 1.5 g | 0.77 | 4.90 | 6.3 | 0.02 | 0.42 |
| R = H* 0.5 mM | N1 190 mg | B1 1.5 g | 0.96 | 4.89 | 6.5 | 0.02 | 0.40 |
| R = H* 0.5 mM | none | none | 0.80 | 5.4 | 3.0 | 0.02 | 0.26 |
| R = H* 0.5 mM | N2 120 mg | B1 1.5 g | 1.02 | 5.3 | 6.7 | 0.03 | 0.46 |
| No dye | N1 190 mg | B1 1.5 g | | 4.95 | 5.7 | 0.02 | 0.41 |
| R = Cl** 0.3 mM | N1 190 mg | B1 1.5 g | 0.78 | 4.98 | 6.2 | 0.02 | 0.40 |
| R = Cl** 0.5 mM | N1 190 mg | B1 1.5 g | 0.88 | 4.84 | 5.5 | 0.02 | 0.40 |

*λ max = 480 nm
**λ max = 490 nm

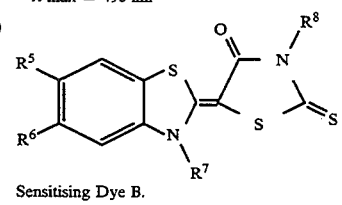

Sensitising Dye B.

TABLE 2

Rhodanine dyes

| Sens Dye B mM/Agmole | Nucleator mg/Agm | Booster g/AgM | SPD | PDP | TOE | Dmin | Intrinsic |
|---|---|---|---|---|---|---|---|
| $R^5 = R^6 = R^8 = H$* $R^7 = C_2H_5$ 0.3 mM | N1 190 mg | B1 1.5 g | 0.55 | 4.87 | 5.8 | 0.02 | 0.36 |
| $R^5 = R^6 = R^8 = H$* $R^7 = C_2H_5$ 0.5 mM | N1 190 mg | B1 1.5 g | 0.67 | 4.77 | 5.4 | 0.02 | 0.31 |
| $R^5 = R^6 = H$* $R^8 = Et$ $R^7 = SP$** 0.3 mM | N1 190 mg | B1 1.5 g | 0.66 | 4.70 | 4.3 | 0.02 | 0.28 |
| $R^5 = R^6 = H$* $R^8 = Et$ $R^7 = SP$** 0.5 mM | N1 190 mg | B1 1.5 g | 0.70 | 4.81 | 4.1 | 0.02 | 0.25 |
| No dye | N1 | B1 | | 4.95 | 5.7 | 0.02 | 0.41 |

TABLE 2-continued

| | Rhodanine dyes | | | | | | | |
|---|---|---|---|---|---|---|---|---|
| Sens Dye B mM/Agmole | Nucleator mg/Agm | Booster g/AgM | SPD | PDP | TOE | Dmin | Intrinsic | |
| control | 190 mg | 1.5 g | | | | | | |

*λ max = 470 nm
** = sulphopropyl

The data indicate that high contrasts are achieved by all coatings containing nucleator and booster. Table 1 shows a TOE of 3.0 for a non-nucleated material compared to 6.5 for the nucleated version.

A comparison of the two tables shows that the thiobarbituric acid dyes give no desensitisation effects (low intrinsic speeds) which in turn helps to give high spectral speed.

It is claimed that this specific combination of thiobarbituric acid dimethine merocyanine dyes with sulphonamidophenyl hydrazide nucleators and PEO amine boosters gives a unique high quality scanner film. By extension, other scanner films and many other rapid access films and papers can be improved by this technology.

Further, the thiobarbituric acid dimethine merocyanine dyes, tested, have been shown to give superior safelight handling performance when compared to other dyes which sensitize at 480 nm. This can be explained by their sharp cut off in sensitivity above 500 nm. The table below compares the safelight fogging tendency for some of these dyes. (The safelight fogging was evaluated by exposing to 60 watt bulb in a Kodak Beehive safelight containing an ML-2 safelight filter and comparing fog growth with time for each dye).

| Dye | λ max Safelight Fog |
|---|---|
| 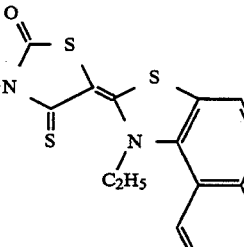 | 480 nm >> Ref |
| 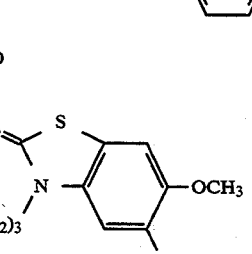 | 480 nm >> Ref |
| SENS DYE A (R = H) | 480 nm << Ref |
| SENS DYE A (R = Cl) | 490 nm << Ref |
| Ref = KODAK ESY SCANNER FILM | |

We claim:

1. A photographic element comprising a support bearing a layer of a silver halide emulsion comprising at least 50% silver chloride which contains in or adjacent said emulsion layer a hydrazide nucleating agent and an amine booster, the combination of which is capable of providing high contrast images; said emulsion being sensitized with a dye of the general formula:

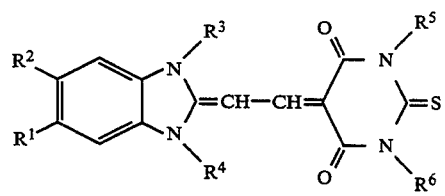

wherein
each of $R^1$ and $R^2$ are individually hydrogen, methyl, ethyl, propyl, butyl sulfoethyl, sulfopropyl, Cl, Br, CN or $CF_3$,
$R^3$ is an alkyl or substituted alkyl group,
$R^4$ is a sulfoalkyl group,
$R^5$ and $R^6$ are individually an alkyl or substituted alkyl group, and
said dye includes any necessary counter-ion;
said amine booster being an amino compound which:
(1) comprises at least one secondary or tertiary amino group,
(2) contains within its structure a group comprised of at least three repeating ethyleneoxy units, and
(3) has an n-octanol/water partition coefficient (log P) of at least one, wherein log P is defined by the formula:

$$\log P = \log \frac{[X]_{octanol}}{[X]_{water}}$$

wherein X is the concentration of said amino compound.

2. A photographic element as claimed in claim 1 in which said hydrazide nucleating agent has the formula:

$$R^9\text{—NHNHCHO}$$

wherein $R^9$ is a phenyl nucleus having a Hammett sigma value-derived electron withdrawing characteristic of less than +0.30.

3. A photographic element as claimed in claim 1, in which said hydrazide nucleating agent is a sulfonamide-substituted hydrazine having one of the following structural formulae:

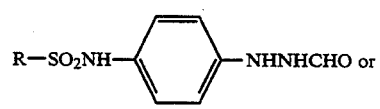

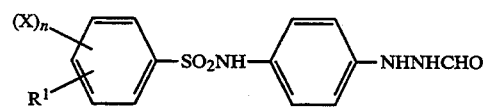

wherein

R is alkyl having from 6 to 18 carbon atoms or a heterocyclic ring having 5 or 6 ring atoms, including ring atoms of sulfur or oxygen;

$R^1$ is alkyl or alkoxy having from 1 to 12 carbon atoms;

X is alkyl, thioalkyl or alkoxy having from 1 to about 5 carbon atoms; halogen; or —$NHCOR^2$,— $NHSO_2R^2$, —$CONR^2R^3$ or —$SO_2R^2R^3$ where $R^2$ and $R^3$, which can be the same or different, are hydrogen or alkyl having from 1 to about 4 carbon atoms; and n is 0, 1 or 2.

4. A photographic element as claimed in claim 1, in which said hydrazide nucleating agent is any one of the compounds having the following formulae:

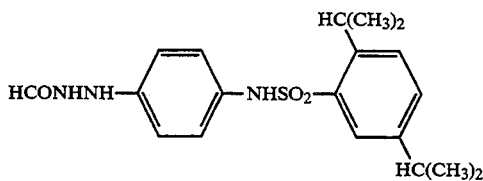

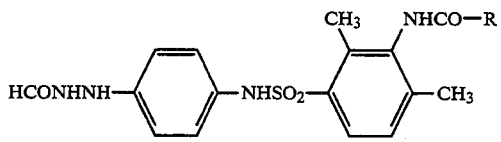

wherein R is

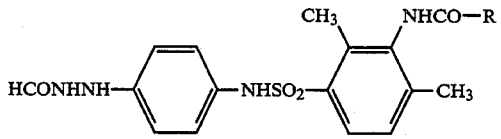

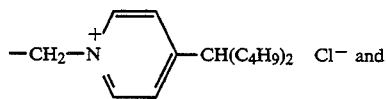

wherein R is

—$CH_2S$—$(CH_2CH_2O)_4$—$C_8H_{17}$

5. A photographic element as claimed in claim 1, in which said silver halide emulsion comprises at least 70% chloride and less than 10% iodide.

6. A photographic element as claimed in claim 1, in which said silver halide emulsion is doped with a Group VIII metal.

7. A photographic element as claimed in claim 6, in which said Group VIII metal dopant is present in an amount in the range of $10^{-9}$ to $10^{-3}$ moles per mole of silver.

* * * * *